(12) United States Patent
France

(10) Patent No.: US 9,366,765 B2
(45) Date of Patent: Jun. 14, 2016

(54) HANDHELD GIS DATA COLLECTION DEVICE TARGET AUGMENTATION

(71) Applicant: Peter G France, Christchurch (NZ)

(72) Inventor: Peter G France, Christchurch (NZ)

(73) Assignee: Trimble Navigation Limited, Sunnyvale, CA (US)

( * ) Notice: Subject to any disclaimer, the term of this patent is extended or adjusted under 35 U.S.C. 154(b) by 113 days.

(21) Appl. No.: 14/280,302

(22) Filed: May 16, 2014

(65) Prior Publication Data

US 2015/0332500 A1    Nov. 19, 2015

(51) Int. Cl.
*G06T 17/05* (2011.01)
*G01S 19/51* (2010.01)
*G06T 19/00* (2011.01)
*G01S 17/02* (2006.01)
*G01S 17/08* (2006.01)
*G01C 15/00* (2006.01)

(52) U.S. Cl.
CPC ............... *G01S 19/51* (2013.01); *G01C 15/002* (2013.01); *G01S 17/023* (2013.01); *G01S 17/08* (2013.01); *G06T 17/05* (2013.01); *G06T 19/006* (2013.01); *G06T 2215/16* (2013.01)

(58) Field of Classification Search
None
See application file for complete search history.

(56) References Cited

U.S. PATENT DOCUMENTS

| 5,898,484 | A | 4/1999 | Harris |
| 5,926,259 | A | 7/1999 | Bamberger |
| 7,738,082 | B1 * | 6/2010 | Peters ..................... G01C 3/22 356/4.01 |
| 7,834,806 | B2 | 11/2010 | Tucker |
| 2009/0293012 | A1 * | 11/2009 | Alter ...................... G01C 21/20 715/810 |

* cited by examiner

*Primary Examiner* — Edward Martello
(74) *Attorney, Agent, or Firm* — NUPAT, LLC; Morrison Ulman

(57) ABSTRACT

Target augmentation makes GIS data collection devices more intuitive and useful for GIS workers, and reduces GIS data collection errors.

16 Claims, 9 Drawing Sheets

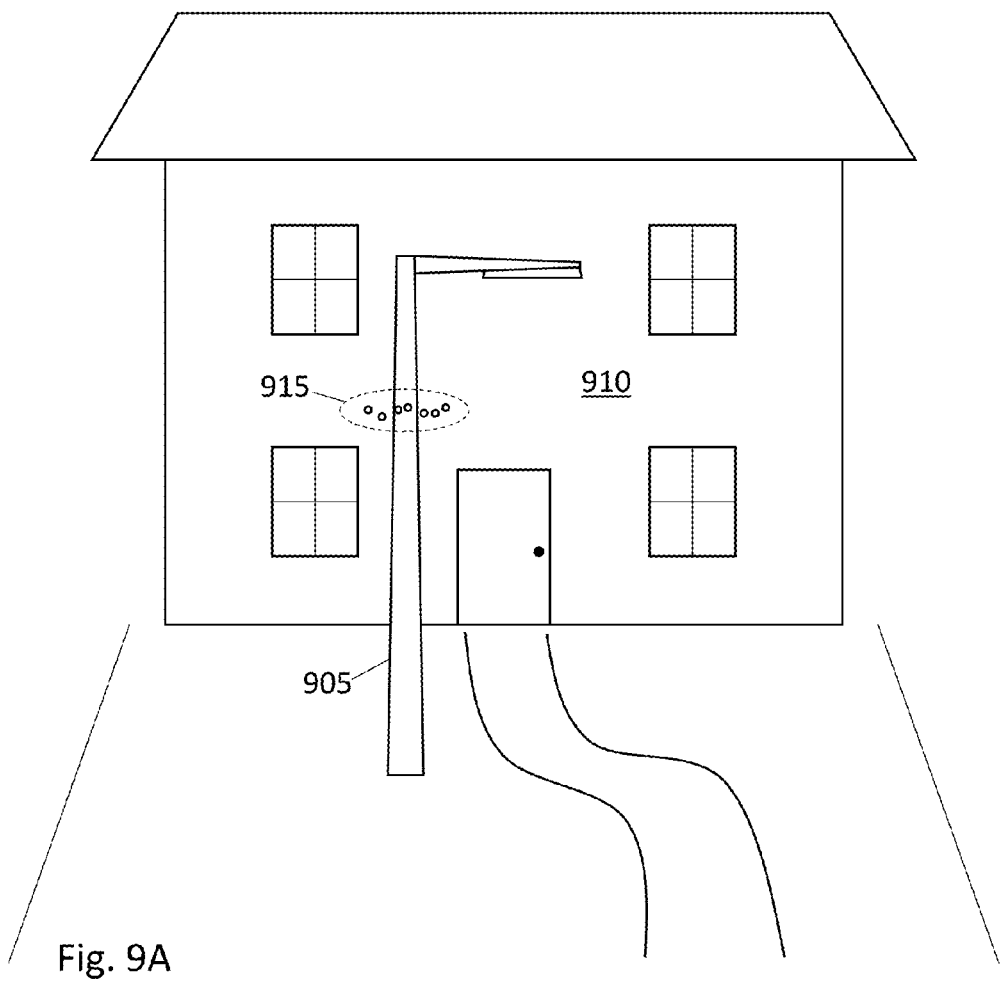
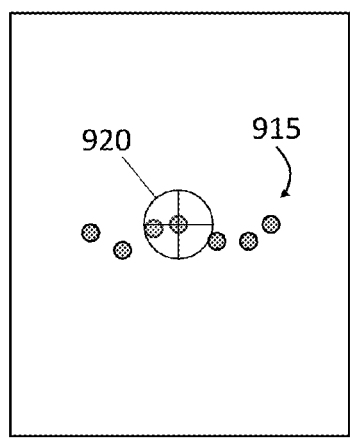
Fig. 9B
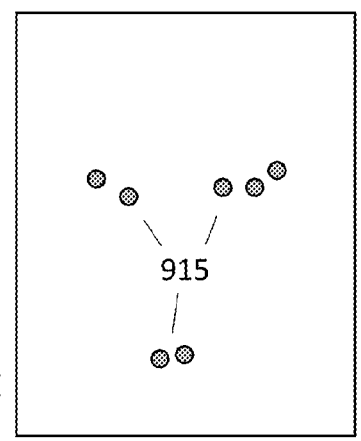
Fig. 9C
Fig. 9A

HANDHELD GIS DATA COLLECTION DEVICE TARGET AUGMENTATION

TECHNICAL FIELD

The disclosure is related to geographic information services (GIS) data collection devices.

BACKGROUND

A geographic information services (GIS) data collection device includes a global positioning system and/or global navigational satellite system (GPS/GNSS) receiver, a laser rangefinder, pitch and roll sensors, a digital compass, a video camera, a mobile processor and a display. Such GIS devices are often used for collecting or confirming the position and dimensions of trees, manhole covers, power lines, power poles, building structures, streams, ponds, lakes, hydrants, fence lines, park benches, etc.

In operation, GPS/GNSS measurements provide the location of the GIS device itself while laser rangefinder and pitch and roll measurements provide the location of a target object with respect to the GIS device. State-of-the-art, commercially available GIS devices may have GPS/GNSS accuracy of approximately 10-100 cm, compass heading accuracy of approximately 1-2 degrees and laser rangefinder accuracy of approximately 5 cm. Accuracy is worse for distant targets compared to near ones because of the increasing effect of compass heading error.

An interesting example of GIS data collection was a project to map helicopter landing zones in thousands of square miles of rural area in the Ozark Mountains in Arkansas. A landing zone is an unobstructed area of at least 100×100 feet, and flat enough to land a helicopter safely. The project involved confirming the location of existing landing zones and mapping new ones. Workers were surprised to learn that the coordinates of many existing landing zones were wildly inaccurate. One was in the middle of a lake.

Landing zone coordinates may be defined by mapping the locations of obstacles, such as trees, power poles, large rocks, etc., at the periphery. In projects like this, rather than taking GPS/GNSS measurements under tree canopy and perhaps suffering degraded accuracy, workers can instead remain in an open area and aim a GIS device's laser rangefinder at targets to collect their locations. In Arkansas, once verified landing zone coordinates were entered into a database, response times for emergency workers traveling by helicopter were dramatically reduced, and medical emergencies, such as heart attacks, were less likely to be fatal.

Rangefinders of conventional GIS devices show an image of the object being measured. Even so, it is not always clear to a user what the device is measuring. When target objects are close together, the wrong one may be measured. If GPS/GNSS signals are weak at the position of the GIS device, accuracy may not be as good as expected. Mistakes and problems like these reduce the value of GIS data. Thus, there exists a need to make mobile GIS data collection devices even more useful by helping users understand measurements quickly and intuitively.

BRIEF DESCRIPTION OF THE DRAWINGS

FIGS. 9A-9C illustrate target selection from multiple measurements. FIG. 9A illustrates a multiple measurement scenario while FIGS. 9B and 9C show views provided on a mobile GIS data collection device screen.

DETAILED DESCRIPTION

Typical scenarios involving handheld GIS devices include workers using the devices to measure locations of trees or heights of structures. Questions arise during these and myriad similar tasks: How accurate is each measurement? Is the measurement accuracy acceptable? Is the user measuring the right thing? Can the user be sure what point is being measured?

Answers to these questions and more are provided by handheld GIS-data-collection-device target augmentation as described below. A GIS device display may be augmented with markers that clearly and intuitively show what is being measured and how accurate the measurement is. Intuitive display concepts speed up data collection by letting users discard bad data and avoid measuring the wrong thing. When user confidence in each measurement is increased, less time is wasted on redundant measurements and overall confidence in GIS database accuracy is improved.

Four examples of target augmentation and its uses in GIS devices are detailed below: (1) augmented reality markers that appear to remain fixed on a measured object seen on a GIS device screen; (2) augmented reality accuracy indicators; (3) vertical and horizontal measurement modes and augmented reality symbols; and, (4) target selection from multiple measurements. Each of these examples of target augmentation helps users understand what their GIS devices are doing and helps them do their jobs better.

Figure 1:
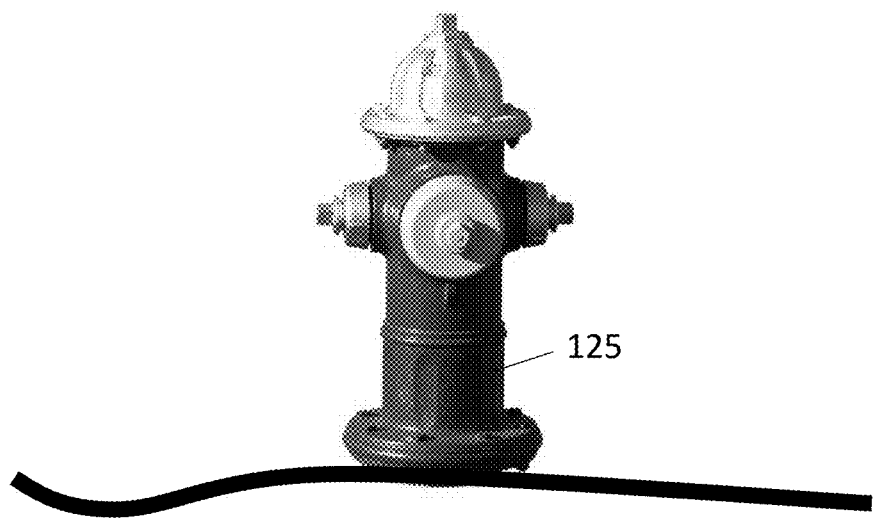
FIG. 1 shows a mobile GIS data collection device measuring a target position via GPS/GNSS and laser rangefinder.
Figure 1:
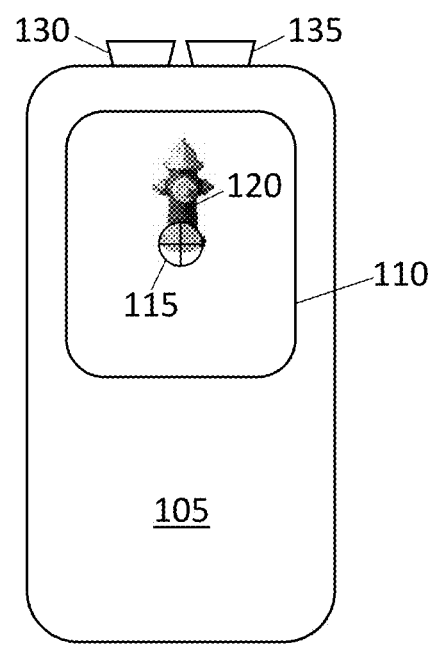

FIG. 1 shows a mobile GIS data collection device 105 measuring a target position via GPS/GNSS and laser rangefinder. The GIS device has a screen 110 which shows an aiming symbol 115 and a video image 120 of target 125 which, in this example, is a fire hydrant. Camera 130 captures images of the target while laser rangefinder 135 measures distance to it from the GIS device. Aiming symbol 115, a semi-transparent circular cross hair in this case, remains in the center of the screen. It shows what the laser rangefinder is aiming at. In typical operation, an operator presses a button on the GIS device to indicate when the cross hairs are aimed at a desired target. When the button is pressed, range and angle measurements are made and target position is calculated.

Figure 2A:
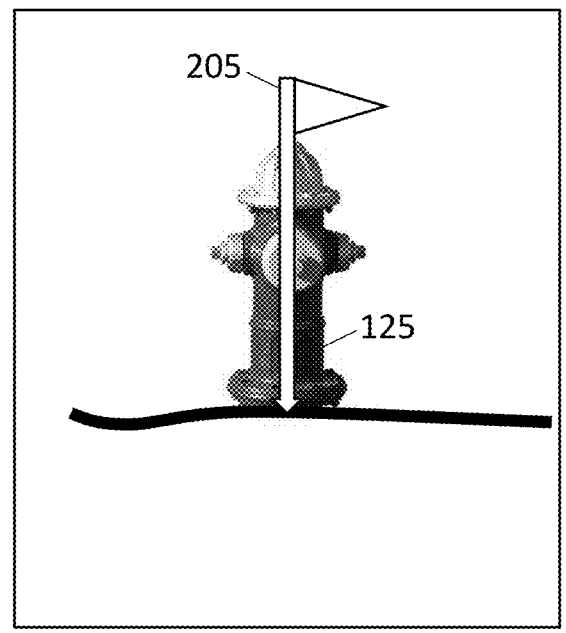
FIGS. 2A and 2B are views seen on a mobile GIS data collection device screen.
Figure 2B:
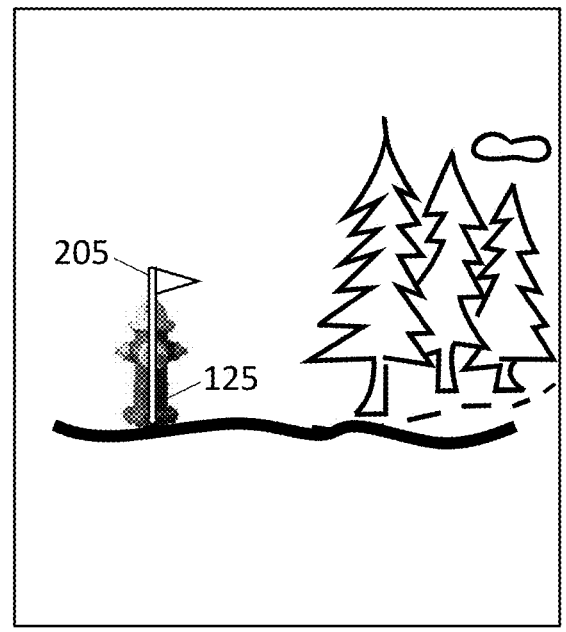

FIGS. 2A and 2B are views seen on a mobile GIS data collection device screen after a measurement of target position has been made. In FIG. 2A, the position of target 125 has been measured and is marked by a virtual flag 205. The flag is "virtual" because it is drawn by a processor on the video display only. No corresponding actual flag need exist at the actual target. In FIG. 2B the same flag 205 marks the same target 125, but the view has shifted such that trees are visible in the right hand side of the frame.

Virtual flag 205 is an example of an augmented reality target marker. It appears to stay with its target no matter how the view seen by the GIS device camera varies. It is possible for a processor to draw the flag in the right place, and at the right size, on the screen because the measurement of the target establishes the flag's position (e.g. latitude, longitude, elevation) and pitch, roll and heading (compass) sensors in the GIS device provide information to determine which way the camera is aiming. Knowledge of the camera's position and attitude, and the target's position is sufficient information for a processor to draw augmented reality markers realistically on screen.

Figure 3:
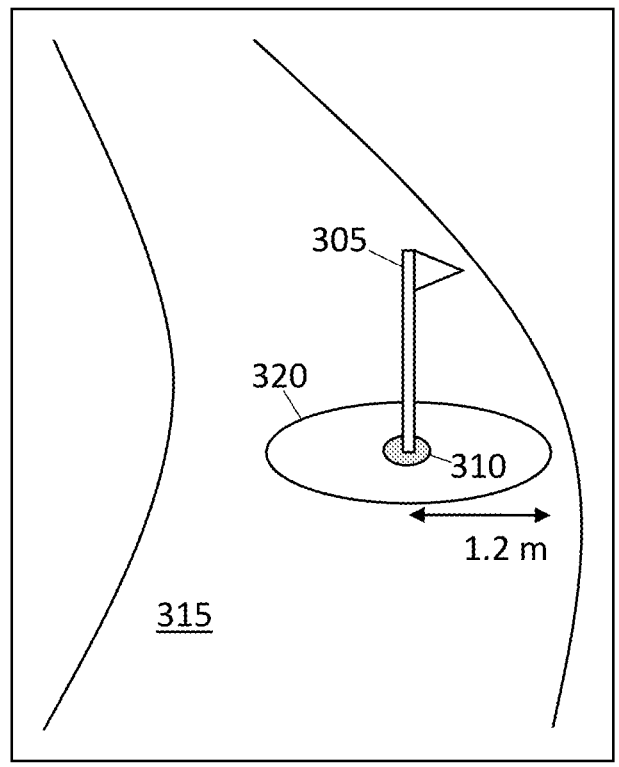
FIG. 3 shows an example of target and accuracy graphics.

FIG. 3 shows an example of target and accuracy graphics. In the GIS screen view of FIG. 3, augmented reality marker 305 (a flag in this case) marks a previously measured, target manhole cover 310 in road 315. Circle 320, drawn in perspective, indicates the accuracy of the measurement. Optional text markers ("1.2 m" here) and arrows show the size of the circle. The circle may be defined, for example, as the 95% confidence boundary for the measured position coordinates. In the example of FIG. 3, the measured coordinates for the manhole cover are within 1.2 m of the actual location of the cover with 95% probability. If accuracy circle 320 is too large, a user may elect to discard the measurement of the manhole cover's location and try again, perhaps from a location closer to the target or with better GPS/GNSS visibility. The circle is drawn in perspective so that it appears to lie in the plane of the road.

Figure 4A:
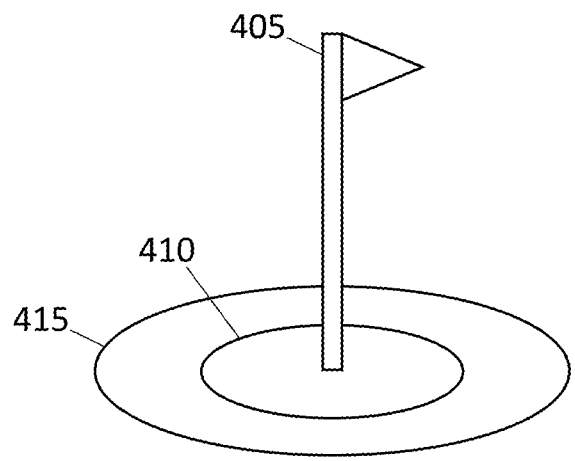
FIGS. 4A and 4B provide additional examples of accuracy indicators.
Figure 4B:
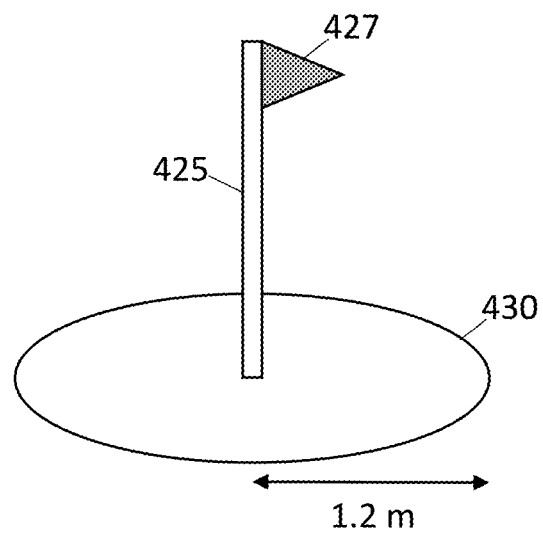

FIGS. 4A and 4B provide additional examples of augmented reality accuracy markers. In FIG. 4A, augmented reality marker 405 marks a measured target. Accuracy circles 410 and 415, drawn in perspective, show the accuracy of the measurement and a predetermined uncertainty limit. Since circle 410 lies within circle 415, a user may be confident that the measurement of the target marked by marker 405 is within acceptable accuracy tolerances for the particular job. These tolerances may be set by company policy or customer requirements, for example.

As an alternative, FIG. 4B shows an augmented reality marker 425 with optional accuracy circle 430. In this case the pennant 427 of the marker changes color if the accuracy of the underlying target measurement is within acceptable limits. For example, an object measured with acceptable accuracy might be marked with a green flag, while one that had a less accurate measurement might be marked with a red flag. Circle 430 may be used in this case to show what the acceptable accuracy tolerance is.

The flag-style markers of FIGS. 2, 3 and 4, are of course, just one example of how an augmented reality target marker may be implemented in a GIS data collection device. Other possibilities include arrows, crosshairs, Maltese crosses, etc. It is desirable, however, that the augmented reality markers be easily distinguished from aiming symbols such as 115 in FIG. 1. Aiming symbols remain in the center of the screen, aligned with the laser rangefinder, while augmented reality markers appear to be fixed in space regardless of how the camera's field of view changes.

Figure 5:
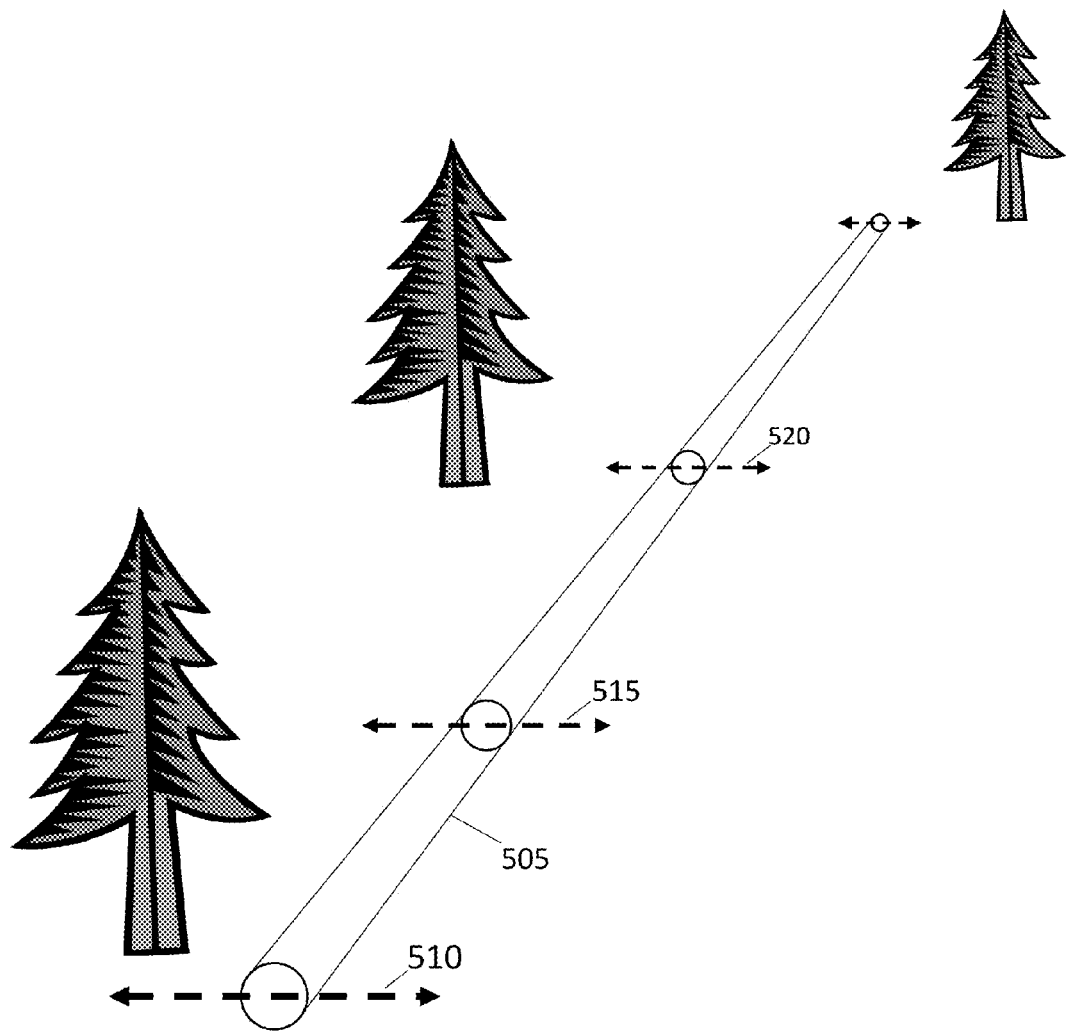
FIG. 5 shows an example of accuracy indicators for a line feature.

FIG. 5 shows an example of accuracy indicators for a line feature 505. Examples of line features include pipes, wires, fences and streams. A line feature may be defined by points measured along it. For example, the position of a fence might be measured every 20 meters along the fence. For GIS data collection purposes, the line feature is assumed to run directly from one measured position to the next. Accuracy indicators, such as 510, 515, 520, show uncertainty in the position of measured points along the line feature. In the example of FIG. 5, the accuracy indicators indicate the lateral extent of uncertainty; however, analogous indicators may be displayed for vertical uncertainties as well.

Figure 6:
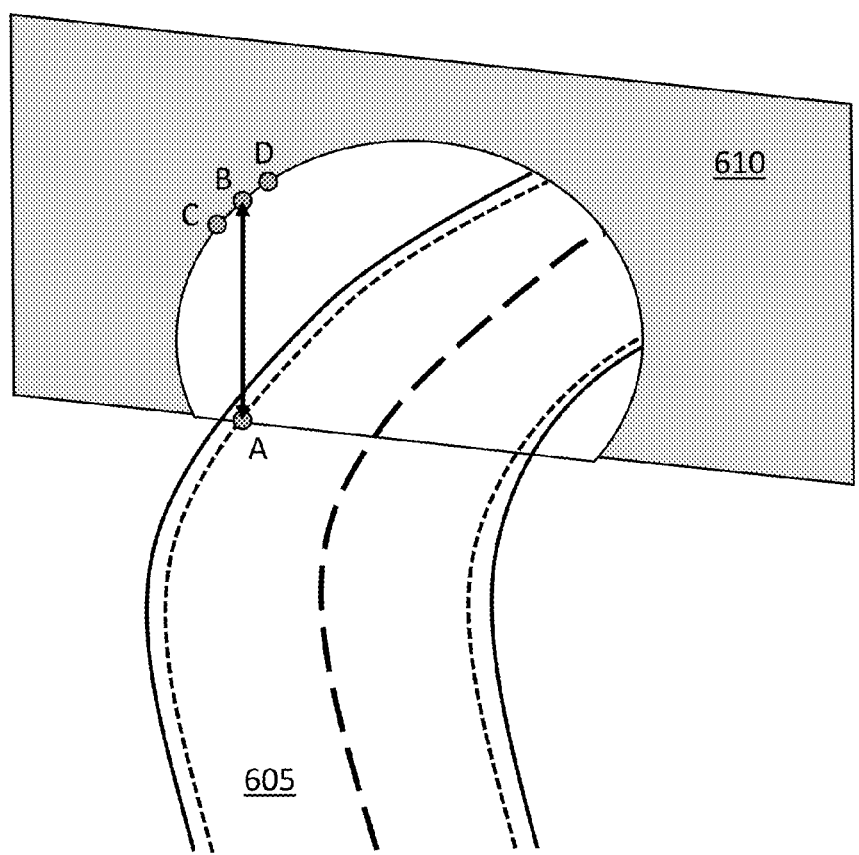
FIG. 6 illustrates a vertical height measurement application.

Accuracy in a GIS data collection scenario is obtained not just from the quality of GPS/GNSS and laser rangefinder measurements, but also from assuring that the user of a GIS device measures the correct real-world feature. FIG. 6 illustrates a height measurement application where "accuracy" includes ensuring that the measurement performed is vertical, rather than slanted.

In FIG. 6, road 605 proceeds into tunnel 610. The desired height measurement is from point "A", on the surface of the road, to point "B" on the ceiling of the tunnel. Point "B" is, by definition, directly overhead point "A". An operator of a GIS device may make this measurement by aiming his device first at point "A" and then at point "B". With a traditional device, however, he has no way to be sure that he has really measured point "B". He may have inadvertently obtained a measurement at point "C" or point "D", for example. Measuring either of these points will result in an erroneous measurement for the height of the tunnel ceiling over the road at point "A". Augmented reality symbols displayed on a GIS device screen during aiming can prevent these kinds of errors.

Figure 7A:
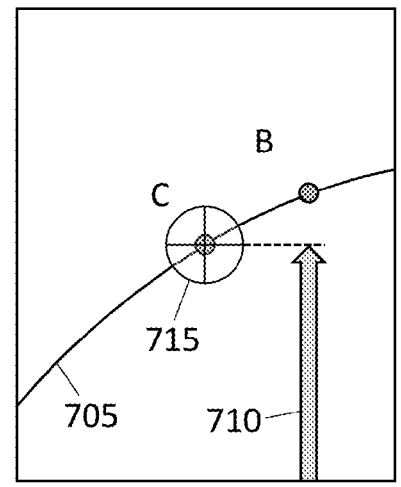
FIGS. 7A-7C are views seen on a mobile GIS data collection device screen during height measurement.
Figure 7B:
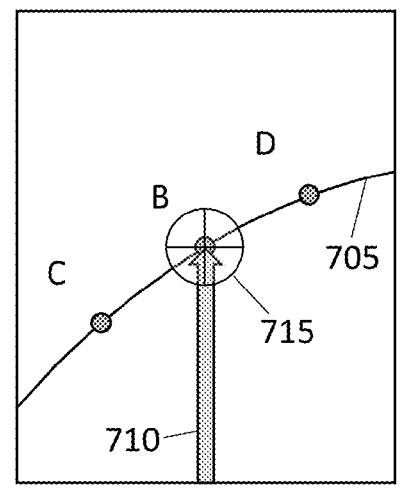
Figure 7C:
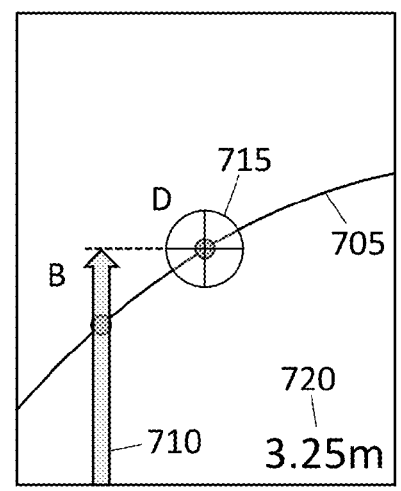

FIGS. 7A-7C are views seen on a mobile GIS data collection device screen during the height measurement of the ceiling 705 of the tunnel in FIG. 6. Points "B", "C" and "D" correspond to the same thing in each of FIGS. 6, 7A-7C. FIGS. 7A-7C show how augmented reality symbols may be used to help users understand measurement modes and prevent making unintended measurements.

For purposes of illustration, assume that a user has measured the coordinates of point "A" in FIG. 6 with a GIS device and has designated that point as the starting point for a vertical measurement. Vertical measurement mode may be selected from on-screen menu options or gestures, for example.

In FIGS. 7A-7C, aiming symbol 715 shows where the GIS device is aimed. In vertical measurement mode, a variable-length arrow 710 is shown extending from the initial point (point "A" in this example) to a position vertically displaced from the initial point by the same amount as the aim point. The aiming symbol coincides with the tip of the arrow if the device is aimed at a point vertically above or below the initial point.

In FIG. 7A, the device is aimed at point "C" as shown by aiming symbol 715. Arrow 710 is drawn vertically from point "A" (not seen because it is out of the camera's field of view and therefore off screen) to a level that is at the same height as the aiming symbol. It is intuitively clear to a user that point "C" is not the point on the ceiling of tunnel 610 that is directly overhead point "A" because aiming symbol 715 is not superimposed on the tip of arrow 710. It is further intuitively clear that the GIS device must be aimed farther to the right to align the aiming symbol with the arrow.

As a user aims the GIS device in different directions, all of the following are true: (1) the aiming symbol 715 shows where the device is aiming; (2) the arrow 710 extends vertically from the initial point; and, (3) the tip of the arrow is at the same height as indicated by the aiming symbol. The processor knows which direction is vertical—and therefore how to draw the variable length arrow vertically—based on pitch and roll sensors. Although rangefinder measurements may be made at any time, once the initial point of the arrow is established, the length and direction of the arrow on the screen may be updated several times per second based on pitch and roll sensor data without the need for additional rangefinder data.

Measuring tree height provides an example of features of vertical measurement mode. An initial measurement point at the base of a tree can be established with the aid of a laser rangefinder measurement. Fine branches at the top of the tree are not easily measured via laser rangefinder, but they need not be. An angular measurement of the direction from the GIS device to the top of the tree establishes the tree's height in conjunction with a vertical line from the initial point as indicated by a variable length arrow on the GIS device display. Fast display updates of the arrow help a user aiming the device understand what will be measured when he records a measurement; e.g. by pressing a button.

The arrow is a form of augmented reality marker since it appears to originate from the initial point regardless of where that point is in the camera's view and even if the initial point is out of view. The height from the initial point to the tip of the arrow may optionally be displayed in text form. An arrow is, of course, just one of many, similar possible variable length indicators such as bars, lines or other graphic objects that may serve as height indicators or horizontal length indicators.

In FIG. 7B, the device is aimed at point "B", the point on the ceiling of the tunnel directly overhead point "A" on the road. This condition is intuitively clear to a GIS device user as the aiming symbol and the tip of the arrow coincide and the aiming symbol is superimposed on the tunnel ceiling 705. When a user sees the view shown in FIG. 7B he can be sure he is measuring the vertical height from the road to the tunnel ceiling.

In FIG. 7C, the device is aimed too far to the right, at point "D". FIG. 7C further illustrates optional text display 720 of the height. Color may be used to differentiate instant height versus recorded height. For example, while a user is aiming, the height display may change several times per second to show the vertical height from the initial point to the aim point. When the device is aimed correctly, the user takes action, such as pressing a button, to record a measurement. Once the measurement is made, the height may be displayed in a different color and arrow 710 may also change color. In addition, once a measurement is made, the height arrow is fixed to the selected point in the scene and no longer follows the aim point in the center of the screen. This allows the user to confirm that the selected point is the desired, correct end point.

Figure 8:
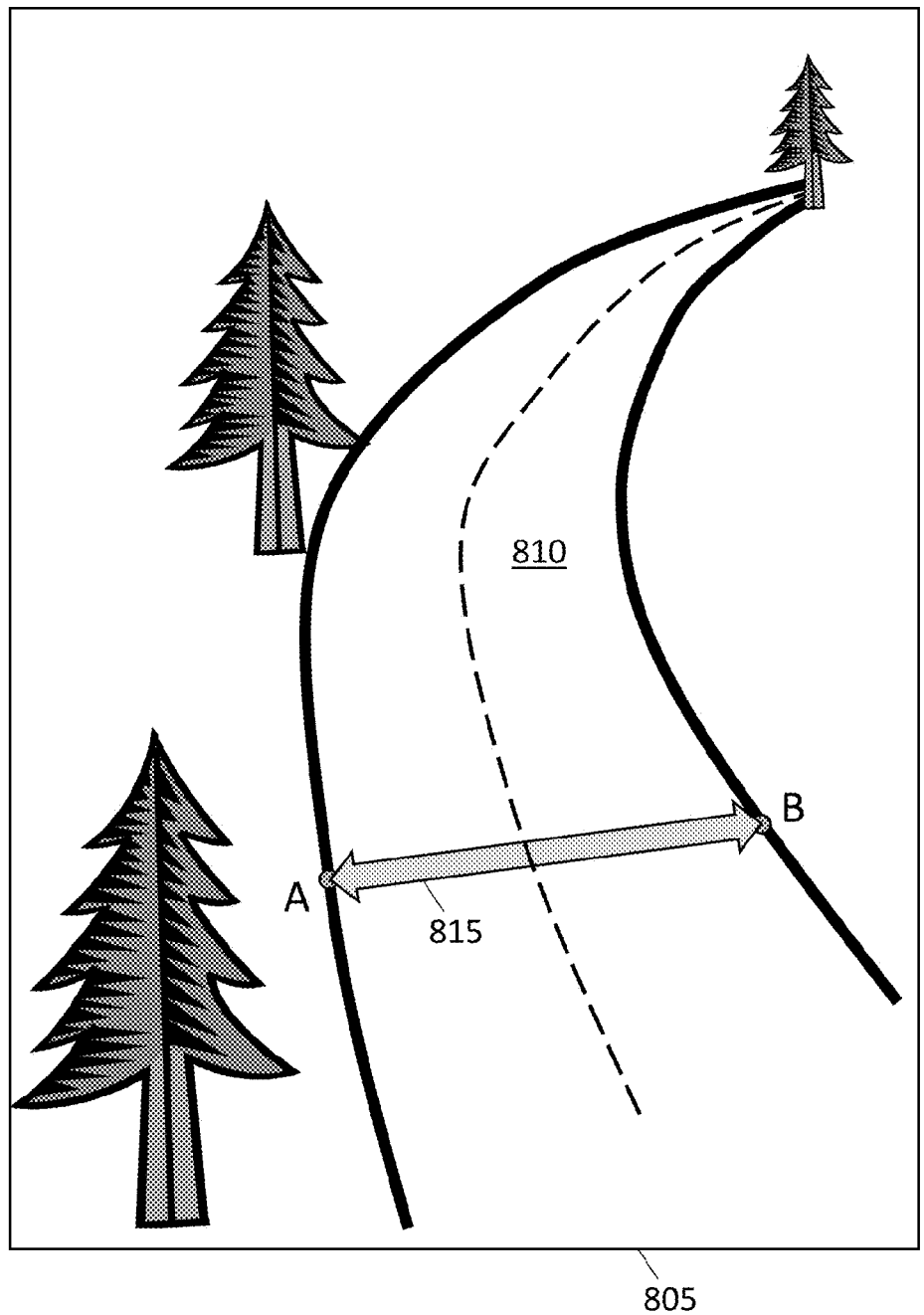
FIG. 8 illustrates a horizontal measurement aided by an augmented reality arrow marker.

The example of FIGS. 6, 7A-7C involves height measurement, but similar principles may be applied to a horizontal measurement as well. For horizontal measurements, the GIS device uses its heading, pitch and roll sensors to draw an arrow from an initial point to the aiming point. FIG. 8 illustrates a horizontal measurement aided by an augmented reality arrow marker.

In FIG. 8, display screen 805 of a GIS device depicts a scene including road 810. The desired horizontal measurement is the width of road 810 from point "A" to point "B". Once a measurement of point "A" has been made, the GIS device draws and automatically updates a horizontal arrow 815 that starts at "A" and ends at the aiming point. FIG. 8 shows the display after the end point of the horizontal measurement, point "B", has been selected by a user.

Both vertical and horizontal measurements involve aiming symbols and augmented reality arrows. During vertical measurements the aiming symbol becomes separated from the arrow (see, e.g. FIG. 7C) whenever the device is aimed away from a vertical line starting at the initial point. During horizontal measurements, however, results are undefined whenever device is aimed away from a horizontal plane containing the initial point. In the scenario of FIG. 8, if point "A" was the initial point, the end of arrow 815 would coincide with an aiming symbol—before a measurement was recorded—whenever that symbol was aimed at a point in the horizontal plane containing point "A". A common horizontal measurement situation is one in which the initial point is below the GIS device. In that case the user must aim below the horizon to measure a horizontal distance.

Augmented reality symbols further improve GIS data collection by allowing a user to select intended measurements in preference to unintended ones. A common scenario that leads to confusion with conventional GIS devices is measuring an object that is in front of another object. It is not always clear if the near or far object has been measured, especially if the distance to each one is similar. Such a scenario is shown in FIGS. 9A-9C which illustrate target selection from multiple measurements. FIG. 9A illustrates a multiple measurement scenario while FIGS. 9B and 9C show views provided on a mobile GIS data collection device screen.

In FIG. 9A, lamppost 905 is in front of building 910. A GIS worker is tasked with measuring the position of the lamppost. If he is not careful, however, he may obtain the position of the building instead. In FIG. 9A, several small augmented reality circles 915 mark measurements made with a laser rangefinder. Some of them are on the lamppost, as desired. Others miss slightly left or right and are, in fact, measurements of building 910. If the lamppost is near the building, and range measurements to either one are similar, it is not always easy to tell which one has been measured. Augmented reality markers make it easy for the worker to distinguish between lamppost and building rangefinder data without concern for placing a GIS device in "nearest" or "farthest" modes.

FIG. 9B shows measurements 915 and aiming symbol 920 as seen on a GIS collection device screen. This view is what is seen by the GIS device's camera; it may also be referred to as an "elevation" view. The same measurements are show in "plan" (i.e. overhead) view in FIG. 9C. In FIG. 9C, the bottom of the screen is closer to the user than the top. In plan view, it becomes immediately clear which points correspond to the lamppost—those that are closer to the user—and which correspond to the building. Once the data is shown in plan view, it is easy for a user to provide input to the processor to select desired points and discard others.

Note that the desired points may have been those farther away; perhaps the lamppost is merely a distraction during a measurement of the building surface, for example. In general, a processor showing measured points on the display from a different perspective than that of the GIS data collection device user helps the user distinguish points that lie in approximately the same direction from the user's perspective, but at different distances. Rendering views from different perspectives is simplified because measured points are represented by absolute three-dimensional coordinates and the user's position is similarly known in three dimensions from GPS/GNSS.

Thus augmented reality symbols make GIS data collection more intuitive by helping users understand their measurements with a minimum of thought. Symbols help users understand data in terms of absolute accuracy (uncertainty along measurement axes), accuracy with respect to expectations (within acceptable tolerances or not) and accuracy of target selection (does the data represent what the user intended to measure). The generation and display of augmented reality symbols on a camera view is made possible because both the three dimensional position of the observer and objects in view is known via the combination of GPS/GNSS, orientation sensors and laser rangefinder data.

The above description of the disclosed embodiments is provided to enable any person skilled in the art to make or use the invention. Various modifications to these embodiments will be readily apparent to those skilled in the art, and the principles defined herein may be applied to other embodiments without departing from the scope of the disclosure. Thus, the disclosure is not intended to be limited to the embodiments shown herein but is to be accorded the widest scope consistent with the principles and novel features disclosed herein.

What is claimed is:

1. A method for reducing geographic information services (GIS) data collection errors comprising:
providing a mobile GIS data collection device including: a global positioning system or global navigational satellite system (GPS/GNSS) receiver, a laser rangefinder having an aiming direction, a digital compass, pitch and roll sensors, a video camera, a video display showing video images obtained by the camera, and a processor;
the GPS/GNSS receiver estimating the position of the GIS data collection device;
the processor estimating the position of a target object with respect to the GIS data collection device based on data obtained by the laser rangefinder and the pitch and roll sensors;
the processor drawing on the video display an aiming symbol corresponding to the aiming direction;
the processor drawing on the video display an augmented reality target marker to mark a measured target object, the target marker appearing to remain fixed to the target object even as the field of view of the camera changes; and,
the processor drawing on the video display an augmented reality accuracy marker that shows estimated accuracy of a position measurement of the measured target object.

2. The method of claim 1, the accuracy marker displayed in a first color if the estimated accuracy meets a predetermined accuracy tolerance and the accuracy marker displayed in a second color otherwise.

3. The method of claim 1, the accuracy marker indicating lateral uncertainty in position of a line feature.

4. A method for reducing geographic information services (GIS) data collection errors comprising:
providing a mobile GIS data collection device including: a global positioning system or global navigational satellite system (GPS/GNSS) receiver, a laser rangefinder having an aiming direction, a digital compass, pitch and roll sensors, a video camera, a video display showing video images obtained by the camera, and a processor;
the GPS/GNSS receiver estimating the position of the GIS data collection device;
the processor estimating the position of a target object with respect to the GIS data collection device based on data obtained by the laser rangefinder and the pitch and roll sensors;
the processor drawing on the video display an aiming symbol corresponding to the aiming direction; and,
the processor drawing on the video display an augmented reality target marker to mark a measured target object, the target marker appearing to remain fixed to the target object even as the field of view of the camera changes; wherein
the target marker is a height indicator, a first end of the indicator appearing to remain fixed to the target object, and a second end of the indicator appearing vertically above or below the first end at the same height as indicated by the aiming symbol.

5. A method for reducing geographic information services (GIS) data collection errors comprising:
providing a mobile GIS data collection device including: a global positioning system or global navigational satellite system (GPS/GNSS) receiver, a laser rangefinder having an aiming direction, a digital compass, pitch and roll sensors, a video camera, a video display showing video images obtained by the camera, and a processor;
the GPS/GNSS receiver estimating the position of the GIS data collection device;
the processor estimating the position of a target object with respect to the GIS data collection device based on data obtained by the laser rangefinder and the pitch and roll sensors;
the processor drawing on the video display an aiming symbol corresponding to the aiming direction; and,
the processor drawing on the video display an augmented reality target marker to mark a measured target object, the target marker appearing to remain fixed to the target object even as the field of view of the camera changes; wherein
the target marker is a horizontal length indicator, a first end of the indicator appearing to remain fixed to the target object, and a second end of the indicator appearing at a point indicated by the aiming symbol in a horizontal plane containing the first end of the indicator.

6. A method for reducing geographic information services (GIS) data collection errors comprising:
providing a mobile GIS data collection device including: a global positioning system or global navigational satellite system (GPS/GNSS) receiver, a laser rangefinder having an aiming direction, a digital compass, pitch and roll sensors, a video camera, a video display showing video images obtained by the camera, and a processor;
the GPS/GNSS receiver estimating the position of the GIS data collection device;
the processor estimating the position of a target object with respect to the GIS data collection device based on data obtained by the laser rangefinder and the pitch and roll sensors;
the processor drawing on the video display an aiming symbol corresponding to the aiming direction;
the processor drawing on the video display an augmented reality target marker to mark a measured target object, the target marker appearing to remain fixed to the target object even as the field of view of the camera changes;
the processor drawing on the display second and subsequent augmented reality target markers to mark multiple target measurements; and,
the processor accepting user input to select one of the target markers and discard the others.

7. The method of claim 6, the processor drawing target markers on the display as viewed from a perspective other than that of the GIS device.

8. The method of claim 7, the perspective being that of a plan view.

9. A mobile geographic information services (GIS) data collection device comprising:
a global positioning system or global navigational satellite system (GPS/GNSS) receiver, a laser rangefinder having an aiming direction, a digital compass, pitch and roll sensors, a video camera, a video display showing video images obtained by the camera, and a processor;
the GPS/GNSS receiver estimating the position of the GIS data collection device;
the processor estimating the position of a target object with respect to the GIS data collection device based on data obtained by the laser rangefinder and the pitch and roll sensors;
the processor drawing on the video display an aiming symbol corresponding to the aiming direction;
the processor drawing on the video display an augmented reality target marker to mark a measured target object, the target marker appearing to remain fixed to the target object even as the field of view of the camera changes; and, the processor drawing on the video display an augmented reality accuracy marker that shows estimated accuracy of a position measurement of the measured target object.

10. The device of claim 9, the accuracy marker displayed in a first color if the estimated accuracy meets a predetermined accuracy tolerance and the accuracy marker displayed in a second color otherwise.

11. The device of claim 9, the accuracy marker indicating lateral uncertainty in position of a line feature.

12. A mobile geographic information services (GIS) data collection device comprising:

a global positioning system or global navigational satellite system (GPS/GNSS) receiver, a laser rangefinder having an aiming direction, a digital compass, pitch and roll sensors, a video camera, a video display showing video images obtained by the camera, and a processor;

the GPS/GNSS receiver estimating the position of the GIS data collection device;

the processor estimating the position of a target object with respect to the GIS data collection device based on data obtained by the laser rangefinder and the pitch and roll sensors;

the processor drawing on the video display an aiming symbol corresponding to the aiming direction; and, the processor drawing on the video display an augmented reality target marker to mark a measured target object, the target marker appearing to remain fixed to the target object even as the field of view of the camera changes; wherein the target marker is a height indicator, a first end of the indicator appearing to remain fixed to the target object, and a second end of the indicator appearing vertically above or below the first end at the same height as indicated by the aiming symbol.

13. A mobile geographic information services (GIS) data collection device comprising:

a global positioning system or global navigational satellite system (GPS/GNSS) receiver, a laser rangefinder having an aiming direction, a digital compass, pitch and roll sensors, a video camera, a video display showing video images obtained by the camera, and a processor;

the GPS/GNSS receiver estimating the position of the GIS data collection device;

the processor estimating the position of a target object with respect to the GIS data collection device based on data obtained by the laser rangefinder and the pitch and roll sensors;

the processor drawing on the video display an aiming symbol corresponding to the aiming direction; and, the processor drawing on the video display an augmented reality target marker to mark a measured target object, the target marker appearing to remain fixed to the target object even as the field of view of the camera changes; wherein the target marker is a horizontal length indicator, a first end of the indicator appearing to remain fixed to the target object, and a second end of the indicator appearing at a point indicated by the aiming symbol in a horizontal plane containing the first end of the indicator.

14. A mobile geographic information services (GIS) data collection device comprising:

a global positioning system or global navigational satellite system (GPS/GNSS) receiver, a laser rangefinder having an aiming direction, a digital compass, pitch and roll sensors, a video camera, a video display showing video images obtained by the camera, and a processor;

the GPS/GNSS receiver estimating the position of the GIS data collection device;

the processor estimating the position of a target object with respect to the GIS data collection device based on data obtained by the laser rangefinder and the pitch and roll sensors;

the processor drawing on the video display an aiming symbol corresponding to the aiming direction;

the processor drawing on the video display an augmented reality target marker to mark a measured target object, the target marker appearing to remain fixed to the target object even as the field of view of the camera changes;

the processor drawing on the display second and subsequent augmented reality target markers to mark multiple target measurements; and, the processor accepting user input to select one of the target markers and discard the others.

15. The device of claim 14, the processor drawing target markers on the display as viewed from a perspective other than that of the GIS device.

16. The device of claim 15, the perspective being that of a plan view.

* * * * *